Patented Oct. 28, 1952

2,615,916

UNITED STATES PATENT OFFICE 2,615,916

PRODUCTION OF ISOPROPYL N-PHENYL CARBAMATE

Edward M. Allen, Wadsworth, Ohio, assignor, by mesne assignments, to Columbia-Southern Chemical Corporation, Pittsburgh, Pa., a corporation of Delaware No Drawing. Application January 21, 1949, Serial No. 72,050

8 Claims. (Cl. 260—471)

This invention relates to a method of preparing isopropyl N-phenyl carbamate and it has particular relation to a method of the preparation of isopropyl N-phenyl carbamate in a purified state.

According to the method herein contemplated, isopropyl chloroformate is reacted with aniline, usually in the presence of a base such as an alkali metal hydroxide, in order to produce the carbamate in solid state. Such product is contaminated with various impurities including water, alkali metal chloride, alkali metal hydroxide or other base, aniline, etc. The product of this reaction may be purified by filtering the solid from the reaction mixture, washing with cold water, and washing with dilute HCl to reduce the pH of the product to approximately seven or eight or approximate neutrality. This product may be purified by recrystallization from ethyl alcohol.

In this process however, the product which is to be filtered from the reaction mixture is in the form of a lumpy, waxy curd, part of which floats on the top of the reaction mixture and part of which settles to the bottom. In such a state or condition, filtration is a difficult, inefficient, and incomplete method of separating the product from the reaction mixture. In addition, it appears that there is entrapped in this lumpy waxy curd a slight amount of aniline which detracts from the purity of the product.

In accordance with this invention, a novel method of preparing isopropyl N-phenyl carbamate has been discovered. This method comprises reacting an isopropyl haloformate, such as isopropyl chloroformate, iodoformate, or bromoformate, with aniline at a temperature above the freezing point of the reaction mixture, but below 10 to 15° C., usually 0 to 10° C., and in the presence of a base such as an alkali metal hydroxide, carbonate and/or bicarbonate. This reaction mixture containing the product in an aqueous solution normally is acidified to neutralize the base, and the mixture, or at least solid isopropyl N-phenyl carbamate obtained therefrom, is heated to a temperature above the melting temperature of the carbamate but below the boiling temperature of the water phase of the mixture, usually 85 to 100° C. Upon such heating, the carbamate melts and two immiscible liquid layers are formed, one being an aqueous layer and the other an organic layer containing the product. After separating the two layers, it is then advantageous to extract the aniline by decantation, centrifugation or other convenient method, from the product-containing organic layer. This is done by one of several methods. One method comprises adding water to the product layer and steam distilling. Another method comprises adding to the product layer a quantity of water, then adding a sufficient amount of a mineral acid usually as a solution containing, say 5 to 30 percent by weight, of a mineral acid such as HCl, to adjust the pH of the solution to about 3 or 4 or other acid concentration at which the aniline is transformed into a water-soluble salt. Following separation of aniline by a liquid phase separation, the product may be converted to a pulverulent granular solid by atomizing and chilling.

A preferred method of procedure is to add isopropyl chloroformate to a mixture of aniline and the base, employing substantially one mole of each reactant. Equally good results are obtained, however, when an excess, for example up to 100 percent or more by molar ratio of aniline is used. When such an excess of aniline is used, a correspondingly smaller amount or base may be used. It is also intended that the invention may be practiced by adding aniline to a mixture of the base and isopropyl chloroformate, or by adding the base to a mixture of aniline and isopropyl chloroformate.

Various basic compounds may be used in the practice of the invention. Inorganic bases such as the oxides, hydroxides, carbonates, the bicarbonates of sodium, potassium, calcium, barium, strontium and magnesium or other alkaline earth metal or alkali metal, organic bases such as pyridine, dimethyl aniline, and quaternary ammonium bases such as trimethyl phenyl ammonium hydroxide are included among these.

Frequently it is desirable to have present an excess, for example, up to 5 to 20 percent by molar ratio, of the basic compound. This excess may be provided by use of an additional base or simply by using an additional amount of the same base. A suitable procedure to employ when this excess is desired is to add isopropyl chloroformate and the base simultaneously to a mixture of aniline and an amount of the same base or a different base. It is to be understood, of course, that the molar ratios of the reactants and the procedures for admixture of the reactants may be varied somewhat and still remain within the scope of the invention.

For a better understanding of the invention, reference may now be had to the following specific examples:

*Example I*

Six hundred milliliters of water, 186 grams of aniline and 168 grams of sodium bicarbonate were placed in a 3 liter, 3 necked reaction flask equipped with a thermometer and a nickel stirrer, and 244 grams (224 milliliters) of isopropyl chloroformate were added dropwise. The reaction was carried out in the temperature range of 0–10° C. and stirring was continued for 20 minutes after all reactants had been added. The reaction mixture was then acidified to a pH of approximately 7 by addition of a sufficient amount of an aqueous solution containing 35 percent by weight of HCl. When the desired pH is attained, the reaction mixture is heated to a temperature range of about 85–90° C., in which temperature range the solid product melts and two immiscible liquid layers are formed, the top layer containing the product. The top layer is poured off, combined with an equal volume of water and steam distilled. Aniline comes over quite rapidly at first but then drops to a slow steady rate.

At this point, distillation is discontinued and the product (the bottom layer) is removed, atomized, and chilled to form a powder-like granular solid.

*Example II*

Three hundred eighty-four milliliters of water, 186 grams of aniline and 21 grams of sodium carbonate were placed in a reaction flask such as described in Example I. Twelve grams of isopropyl chloroformate were added dropwise and then 288 grams of an aqueous solution of 25 percent by weight sodium hydroxide and 220 grams (202 milliliters) isopropyl chloroformate were added simultaneously from burettes. The reaction was carried out in the temperature range of 0–10° C., and stirring was continued for 20 minutes after all reactants had been added. The reaction mixture was then acidified to a pH of approximately 7, by addition of a sufficient amount of an aqueous solution containing 35 percent by weight HCl. When the desired pH is attained, the reaction mixture is heated to a temperature range of about 85–90° C., in which temperature range the solid product melts and two immiscible liquid layers are formed. The top layer containing the product is poured off and a volume of water equal to the volume of the product layer is added. It is then possible to extract the aniline from the product layer as the hydrochloride at a pH below 4. A sufficient amount of an aqueous solution of 30 percent by weight of HCl is added with constant agitation to reduce the pH to between 3 and 4 and the product layer is again separated by liquid phase extraction. The product layer is then atomized and chilled to form a granular powder-like solid product.

As a result of the above described invention, it is possible to effect by a simple means the preparation of isopropyl N-phenyl carbamate in solid granular state, whereas this preparation had heretofore been a difficult and cumbersome procedure.

Although the present invention has been described with reference to specific details of certain embodiments thereof, it is not intended that such details shall be regarded as limitations upon the scope of the invention except insofar as included in the accompanying claims.

I claim:

1. A method of preparing isopropyl N-phenyl carbamate which comprises reacting aniline with an isopropyl haloformate in the presence of water and a base, at a temperature at which solid isopropyl N-phenyl carbamate is produced, heating the reaction mixture to a temperature above the melting point of the carbamate but below the temperature at which the water phase in the mixture boils, thereby forming two immiscible liquid layers, separating the layer containing the product, acidifying said product layer, atomizing the product layer and chilling it to form a uniform, granular, powder-like product.

2. A method of preparing isopropyl N-phenyl carbamate which comprises reacting aniline with an isopropyl haloformate in the presence of water and a base, at a temperature at which solid isopropyl N-phenyl carbamate is produced, heating the reaction mixture to a temperature above the melting point of the carbamate but below the temperature at which the water phase in the mixture boils, thereby forming two immiscible liquid layers, separating the layer containing the product, steam distilling impurities from the product, atomizing the product and chilling it to form a uniform, granular, powder-like product.

3. A method of preparing isopropyl N-phenyl carbamate which comprises reacting aniline with an isopropyl haloformate in the presence of water and a base, at a temperature at which solid isopropyl N-phenyl carbamate is produced, heating the reaction mixture to a temperature at which the product is in the liquid state but not above the temperature at which the water phase in the mixture boils, thereby forming two immiscible liquid layers, one of which contains the product, and separating the layers.

4. In the method of preparing isopropyl N-phenyl carbamate by reaction of an isopropyl haloformate with aniline in the presence of water and a base whereby to produce isopropyl N-phenyl carbamate in solid state and contaminated with water, the improvement which comprises melting the carbamate whereby to cause formation of a pair of immiscible liquid layers, and separating the layers.

5. In the method of recovering isopropyl N-phenyl carbamate from a mixture containing isopropyl N-phenyl carbamate and water, the improvement which comprises melting the carbamate whereby to cause formation of a pair of immiscible liquid layers, and separating the layers.

6. In the method of recovering isopropyl N-phenyl carbamate from a mixture containing isopropyl N-phenyl carbamate and water, the improvement which comprises melting the carbamate whereby to cause formation of a pair of immiscible liquid layers, and separating the layer containing the carbamate, acidifying such layer, separating the carbamate, atomizing and chilling it to form a uniform, granular powder-like product.

7. A method of separating isopropyl N-phenyl carbamate from its reaction mixture created by reaction of an isopropyl haloformate with aniline in the presence of water and a base at a temperature at which solid isopropyl N-phenyl carbamate is produced which comprises heating the reaction mixture to a temperature above the melting point of the carbamate but below the temperature at which the water phase in the mixture boils, thereby forming two immiscible liquid layers, separating the layer containing the product, acidifying said product layer, atomizing the product layer and chilling it to form a granular, powder-like product.

8. A method of separating isopropyl N-phenyl carbamate from its reaction mixture created by reaction of an isopropyl haloformate with aniline in the presence of water and a base at a temperature at which solid isopropyl N-phenyl carbamate is produced, which comprises heating the reaction mixture to a temperature above the melting point of the carbamate but below the temperature at which the water phase in the mixture boils, thereby forming two immiscible liquid layers, separating the layer containing the product, steam distilling impurities from the product, atomizing the product and chilling it to form a uniform, granular, powder-like product.

EDWARD. M. ALLEN.

REFERENCES CITED

The following references are of record in the file of this patent:

UNITED STATES PATENTS

| Number | Name | Date |
|---|---|---|
| 1,994,591 | Reid | Mar. 19, 1935 |
| 2,058,911 | Rapp | Oct. 27, 1936 |
| 2,161,615 | Dietrich | June 6, 1939 |

OTHER REFERENCES

Schmidt: Zeitschrift für Phys. Chem., vol. 58, pp. 515–516 (1907).

Chattaway et al.: J. Chem. Soc., vol. 117, pp. 708–711 (1920).

Spica et al.: Gazz. Chim. Ital., 12, 167 (1887).